US009591004B2

(12) United States Patent
McConnell et al.

(10) Patent No.: US 9,591,004 B2
(45) Date of Patent: *Mar. 7, 2017

(54) GEOGRAPHICAL INTRUSION RESPONSE PRIORITIZATION MAPPING THROUGH AUTHENTICATION AND FLIGHT DATA CORRELATION

(71) Applicant: Palo Alto Networks, Inc., Santa Clara, CA (US)

(72) Inventors: James T. McConnell, Keller, TX (US); Steven Tucker, Naperville, IL (US)

(73) Assignee: Palo Alto Networks, Inc., Santa Clara, CA (US)

( * ) Notice: Subject to any disclaimer, the term of this patent is extended or adjusted under 35 U.S.C. 154(b) by 632 days.

This patent is subject to a terminal disclaimer.

(21) Appl. No.: 14/065,333

(22) Filed: Oct. 28, 2013

(65) Prior Publication Data

US 2016/0226891 A1     Aug. 4, 2016

Related U.S. Application Data

(63) Continuation of application No. 11/683,099, filed on Mar. 7, 2007, now Pat. No. 8,572,734, which is a
(Continued)

(51) Int. Cl.
*G06F 12/12* (2016.01)
*H04L 29/06* (2006.01)
(Continued)

(52) U.S. Cl.
CPC ........ *H04L 63/1416* (2013.01); *G06F 21/554* (2013.01); *G08G 5/0008* (2013.01);
(Continued)

(58) Field of Classification Search
CPC ...... G01M 17/00; B60R 25/10; B60R 25/102; G06F 11/00; H04L 9/00; H04L 67/06;
(Continued)

(56) References Cited

U.S. PATENT DOCUMENTS 4,729,737 A    3/1988  Reagan et al.
5,406,286 A *  4/1995  Tran ........................ G01S 7/021
                                                          342/13
(Continued)

FOREIGN PATENT DOCUMENTS

WO    2005/076135    8/2005

OTHER PUBLICATIONS

Clancy, et al., "Security threats to signal classifiers using self-organizing maps" CROWNCOM '09, 4th International Conference on (978-1-4244-3423-7); 2009 . . . p. 1-6, year 2009.
(Continued)

*Primary Examiner* — Thanhnga B Truong
(74) *Attorney, Agent, or Firm* — Van Pelt, Yi & James LLP

(57) ABSTRACT

Preferred systems and methods for geographically mapping intrusions through network or authentication data and flight data correlation are described. In one aspect, methods and systems include receiving threat data, receiving network or authentication data, receiving flight location data, correlating the threat data and the network or authentication data with the flight location data to generate map data, and generating a map displaying a geographical location of the intrusion based on the map data.

18 Claims, 17 Drawing Sheets

Related U.S. Application Data continuation-in-part of application No. 11/482,934, filed on Jul. 10, 2006, now Pat. No. 8,631,493, which is a continuation-in-part of application No. 10/916,872, filed on Aug. 12, 2004, now Pat. No. 8,082,506, and a continuation-in-part of application No. 10/916,873, filed on Aug. 12, 2004, now Pat. No. 8,091,130.

(51) Int. Cl.

| | |
|---|---|
| G06F 21/55 | (2013.01) |
| G08G 5/00 | (2006.01) |
| H04L 12/24 | (2006.01) |
| H04L 29/12 | (2006.01) |

(52) U.S. Cl.
CPC .............. *H04L 41/12* (2013.01); *H04L 63/14* (2013.01); *H04L 63/1408* (2013.01); *H04L 63/1425* (2013.01); H04L 29/12028 (2013.01); H04L 61/103 (2013.01)

(58) Field of Classification Search
CPC ..... H04L 67/2823; H04L 67/12; H04L 67/10; H04L 67/28; H04L 67/327; B64C 13/24; B64D 45/0015; H04B 7/18508; H04N 21/2146; H04N 21/24; H04N 21/2543; H04N 21/25435; H04N 21/4185; H04N 21/4438; H04N 21/47202; H04N 21/4781; H04N 21/4788
USPC .............. 726/22–25; 713/188; 709/223–225; 380/258, 270
See application file for complete search history.

(56) References Cited

U.S. PATENT DOCUMENTS

| | | | |
|---|---|---|---|
| 5,515,285 A * | 5/1996 | Garrett, Sr. ........... | B60R 25/102 340/426.2 |
| 5,781,704 A | 7/1998 | Rossmo | |
| 5,848,373 A | 12/1998 | DeLorme et al. | |
| 5,940,598 A | 8/1999 | Strauss et al. | |
| 6,088,804 A | 7/2000 | Hill et al. | |
| 6,163,604 A | 12/2000 | Baulier et al. | |
| 6,240,360 B1 | 5/2001 | Phelan | |
| 6,377,987 B1 | 4/2002 | Kracht | |
| 6,430,274 B1 | 8/2002 | Winstead et al. | |
| 6,456,306 B1 | 9/2002 | Chin et al. | |
| 6,456,852 B2 | 9/2002 | Bar et al. | |
| 6,633,230 B2 | 10/2003 | Grandin et al. | |
| 6,691,161 B1 | 2/2004 | Cook et al. | |
| 6,691,256 B1 | 2/2004 | Cook et al. | |
| 6,813,777 B1 * | 11/2004 | Weinberger ........ | H04B 7/18508 348/E5.008 |
| 6,816,090 B2 | 11/2004 | Teckchandani et al. | |
| 6,832,247 B1 | 12/2004 | Cochran et al. | |
| 6,839,852 B1 | 1/2005 | Pantuso et al. | |
| 6,900,822 B2 | 5/2005 | Germain et al. | |
| 6,917,288 B2 | 7/2005 | Kimmel et al. | |
| 6,941,359 B1 | 9/2005 | Beaudoin et al. | |
| 7,031,728 B2 | 4/2006 | Beyer | |
| 7,082,535 B1 * | 7/2006 | Norman .................. | H04L 63/08 709/225 |
| 7,096,498 B2 * | 8/2006 | Judge .................... | G06F 21/554 726/22 |
| 7,146,568 B2 | 12/2006 | Richardson | |
| 7,227,950 B2 | 6/2007 | Faith et al. | |
| 7,243,008 B2 | 7/2007 | Stockdale et al. | |
| 7,260,844 B1 * | 8/2007 | Tidwell ................ | G06F 21/577 726/22 |
| 7,269,796 B1 | 9/2007 | Bayes et al. | |
| 7,272,648 B2 | 9/2007 | Kawasaki et al. | |
| 7,272,795 B2 | 9/2007 | Garding et al. | |
| 7,337,222 B1 | 2/2008 | Du et al. | |
| 7,337,408 B2 | 2/2008 | DeLuca et al. | |
| 7,342,581 B2 | 3/2008 | Vinberg | |
| 7,349,982 B2 | 3/2008 | Hannum et al. | |
| 7,418,733 B2 | 8/2008 | Connary et al. | |
| 7,609,156 B2 | 10/2009 | Mullen | |
| 8,015,604 B1 | 9/2011 | Tidwell et al. | |
| 8,082,506 B1 | 12/2011 | McConnell | |
| 8,091,130 B1 | 1/2012 | McConnell | |
| 8,171,555 B2 | 5/2012 | D'Mello et al. | |
| 8,201,257 B1 | 6/2012 | Andres et al. | |
| 8,352,739 B2 | 1/2013 | Park et al. | |
| 8,359,343 B2 | 1/2013 | McConnell | |
| 8,538,676 B2 | 9/2013 | Wuersch et al. | |
| 8,561,175 B2 | 10/2013 | Williams et al. | |
| 8,571,580 B2 | 10/2013 | Altman et al. | |
| 8,590,047 B2 | 11/2013 | Hoyt et al. | |
| 8,615,582 B2 | 12/2013 | McClure et al. | |
| 8,620,344 B2 | 12/2013 | Huang et al. | |
| 8,634,860 B2 | 1/2014 | Huang et al. | |
| 8,655,371 B2 | 2/2014 | Huang | |
| 8,711,698 B2 | 4/2014 | Cohen et al. | |
| 8,719,198 B2 | 5/2014 | Zheng et al. | |
| 8,745,090 B2 | 6/2014 | Caduff | |
| 2003/0018769 A1 | 1/2003 | Foulger et al. | |
| 2003/0115211 A1 | 6/2003 | Chen et al. | |
| 2003/0200347 A1 | 10/2003 | Weitzman | |
| 2003/0232598 A1 | 12/2003 | Aljadeff et al. | |
| 2004/0003285 A1 | 1/2004 | Whelan et al. | |
| 2004/0044912 A1 | 3/2004 | Connary et al. | |
| 2004/0117624 A1 | 6/2004 | Brandt et al. | |
| 2004/0121787 A1 | 6/2004 | Day et al. | |
| 2004/0172466 A1 | 9/2004 | Douglas et al. | |
| 2004/0233234 A1 | 11/2004 | Chaudhry et al. | |
| 2004/0240297 A1 | 12/2004 | Shimooka et al. | |
| 2004/0260945 A1 | 12/2004 | Raikar et al. | |
| 2005/0075116 A1 | 4/2005 | Laird et al. | |
| 2005/0075119 A1 | 4/2005 | Sheha et al. | |
| 2005/0206513 A1 | 9/2005 | Fallon | |
| 2006/0004497 A1 | 1/2006 | Bull | |
| 2006/0041345 A1 * | 2/2006 | Metcalf .................. | B64C 13/24 701/31.4 |
| 2006/0200490 A1 | 9/2006 | Abbiss | |
| 2007/0008885 A1 | 1/2007 | Bonner | |
| 2007/0038568 A1 | 2/2007 | Greene et al. | |
| 2007/0079243 A1 | 4/2007 | Leigh et al. | |
| 2007/0204033 A1 | 8/2007 | Bookbinder et al. | |
| 2009/0138353 A1 | 5/2009 | Mendelson | |
| 2009/0157744 A1 | 6/2009 | McConnell | |
| 2009/0172773 A1 | 7/2009 | Moore | |
| 2009/0249460 A1 | 10/2009 | Fitzgerald et al. | |
| 2010/0311386 A1 | 12/2010 | Edge et al. | |
| 2011/0016536 A1 | 1/2011 | O'Brien et al. | |
| 2011/0099281 A1 | 4/2011 | Bakker et al. | |
| 2011/0183644 A1 | 7/2011 | Gupta | |
| 2011/0189971 A1 | 8/2011 | Faccin et al. | |
| 2011/0195687 A1 | 8/2011 | Das et al. | |
| 2012/0252493 A1 | 10/2012 | Siddeley et al. | |

OTHER PUBLICATIONS

Fu, Xinwen, et al., "The Digital Marauder's Map: A New Threat to Location Privacy" Distributed Computing Systems, 2009. ICDCS '09. 29th IEEE International Conference on (1063-6927) (978-0-7695-3659-0) 2009. p. 589-596.

Brown et al., "Crime Mapping for Computer Crimes", Charlottesville, VA, Jun. 9, 2000.

U.S. Appl. No. 10/916,872 (now U.S. Pat. No. 8,082,506) Office Action mailed Apr. 3, 2008.

U.S. Appl. No. 10/916,873 (now U.S. Pat. No. 8,091,130) Office Action mailed Apr. 15, 2008.

* cited by examiner

| Attack Name | Attack / Victim |
|---|---|
| Telnet Attack | 10.1.1.1 |
| Witty Worm | 10.1.1.2 |
| Telnet Attack | 10.1.2.1 |

| IP Address | Router Address |
|---|---|
| 10.1.1.1 | 02-69-8C-01-02-03 |
| 10.1.1.2 | 02-69-8C-01-02-03 |
| 10.1.2.1 | 02-69-8C-01-02-04 |

| Router Logical Address | Router Physical Address | City | State | Zip Code |
|---|---|---|---|---|
| 02-69-8C-01-02-03 | 7979 Beltline Road | Irving | TX | 75039 |
| 02-69-8C-01-02-04 | 2319 E. Fowler Avenue | Tampa | FL | 33612 |

| Attack Name | Attacker / Victim | Address | City | State | Zip | Status | Assigned to |
|---|---|---|---|---|---|---|---|
| RPC Bo | 10.1.1.1 | 7979 Beltline Road | Irving | TX | 75039 | Fixed | Tom |
| RPC Bo | 10.1.2.1 | 2319 E. Fowler Avenue | Tampa | FL | 33612 | Open | Fred |
| SSH Bo | 10.1.1.2 | Tampa | Irving | TX | 75039 | Fixed | Mary |

| ID | Aircraft ID | Departure | Arrival | Latitude | Longitude | Date |
|---|---|---|---|---|---|---|
| 300001 | UA4X01L456X | KATL | KSFO | N49.25903 | W122.77428 | 2005-01-18 23:20:11 |
| 300002 | UA9J02X002A | KATL | KSAT | N49 15.542 | W122 46.457 | 2005-02-08 13:50:01 |

1300

| ID | Attack Name | Source IP Address | Destination IP Address |
|---|---|---|---|
| 200001 | RPC Bo | 10.1.1.1 | 10.1.2.1 |
| 200002 | SSH Bo | 10.1.1.2 | 10.1.2.1 |

GEOGRAPHICAL INTRUSION RESPONSE PRIORITIZATION MAPPING THROUGH AUTHENTICATION AND FLIGHT DATA CORRELATION

CROSS-REFERENCE TO RELATED APPLICATIONS

This is a continuation of U.S. patent application Ser. No. 11/683,099, filed Mar. 7, 2007, now Pat. No. 8,572,734, entitled "GEOGRAPHICAL INTRUSION RESPONSE PRIORITIZATION MAPPING THROUGH AUTHENTICATION AND FLIGHT DATA CORRELATION," which is a continuation-in-part of prior co-pending U.S. patent application Ser. No. 11/482,934, filed Jul. 10, 2006. entitled "GEOGRAPHICAL INTRUSION MAPPING SYSTEM USING TELECOMMUNICATION BILLING AND INVENTORY SYSTEMS," which is a continuation-in-part of prior U.S. patent application Ser. No. 10/916,873, filed Aug. 12, 2004, now Pat. No. 8,091,130, entitled "GEOGRAPHICAL INTRUSION RESPONSE PRIORITIZATION MAPPING SYSTEM," and prior U.S. patent application Ser. No. 10/916,872, filed Aug. 12, 2004, now Pat. No. 8,082,506, entitled "GEOGRAPHICAL VULNERABILITY MITIGATION RESPONSE MAPPING SYSTEM," the contents of each of which are incorporated herein by reference in their entirety.

BACKGROUND INFORMATION

A digital or cyber attack on an airline may take the form of a direct attack or an introduction of malicious software such as virus and worm. A successful attack may cause a catastrophe. For example, a digital attack directed against an aircraft's computer system may cause the system to malfunction or shut down the aircraft while the aircraft is airborne. Conversely, a device within or on board an aircraft may start a digital attack, targeting a network point either within the airline or outside the airline.

When an intrusion in computer or telecommunications systems is discovered, response resources must be directed to a physical location of the equipment associated with the intrusion, in theory, for attacks involving aircraft, response resources can be directed to a physical location of the aircraft. In practice, this requires extensive efforts to correlate existing threat information, authentication data, flight data, dramatically reducing response time. For example, today, most responses to an intrusion require manual review of TCP/IP switch information, manual drawing of network "maps" and, most importantly, trying to mitigate an intrusion in a sequential or business prioritization order while these efforts are being undertaken. These response schemes do not allow for an organization's management to easily identify the geographical location of the problem(s) and the location(s) at which resources are most needed. Furthermore, current response schemes do not allow an organization's response or management team timely access to geographical view(s) of the location of the intrusions together with information relating to the status or progress of the response to the intrusion. In other words, intrusion response involving deployment of technical and/or human resources is done on an ad hoc basis, following the intrusions, which limits the ability to prioritize these technical or human resources.

BRIEF DESCRIPTION OF THE DRAWINGS

FIG. 4 is an exemplary screenshot of records in an intrusion database containing intrusion information.

FIG. 5 is an exemplary screenshot of records in an ARP database.

FIG. 6 is an exemplary screenshot of records in a location database.

FIG. 7 is an exemplary screenshot of records in a map database containing information for mapping intrusions.

FIG. 13 is an exemplary screenshot of records in a flight location database.

FIG. 15 is a second example of records in a threat database.

DETAILED DESCRIPTION OF PREFERRED EMBODIMENTS

Figure 1:
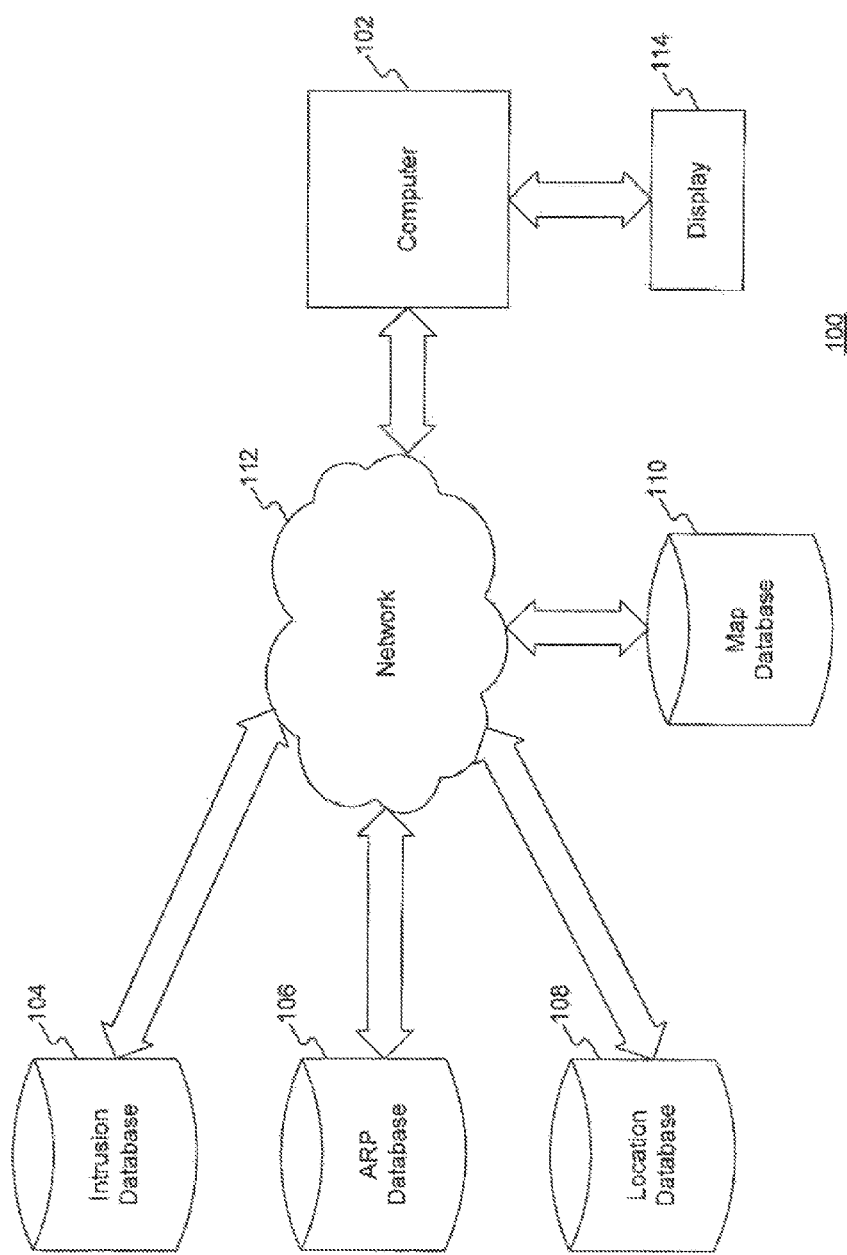
FIG. 1 is a block diagram of an exemplary environment in which the systems and methods of the present invention may be implemented.

Reference will now be made in detail to the exemplary embodiments, examples of which are illustrated in the accompanying drawings. Wherever possible, the same reference numbers will be used throughout the drawings to refer to the same or like parts. It is to be understood that the following detailed description are exemplary and explanatory only and are not restrictive of the invention, as claimed.

As used herein, an "intrusion" is an unauthorized use, attempt, or successful entry into a digital, computerized, or automated system, requiring a response from a human administrator or response team to mitigate any damage or unwanted consequences of the entry. For example, the introduction of a virus and the unauthorized entry into a system by a hacker are each "intrusions" within the spirit of the present invention. An "intrusion response" is a response by systems or human operators to limit or mitigate damage from the intrusion or prevent future intrusions. One of ordinary skill in the art will recognize that, within the spirit and scope of the present invention, "intrusions" of many types and natures are contemplated.

In addition, as used herein, a "vulnerability" is a prospective intrusion, that is, a location in a digital, computerized, or automated system, at which an unauthorized use, attempt, or successful entry is possible or easier than at other points in the system. For example, a specific weakness may be identified in a particular operating system, such as Microsoft's Windows™ operating system when running less than Service Pack 6. Then, all computers running the Windows operating system with less than Service Pack 6 will therefore have this vulnerability. One of ordinary skill in the art will recognize that this and other vulnerabilities may be identified by commercially available software products. While methods of locating such vulnerabilities are outside the scope of the present invention, one of ordinary skill in the art will recognize that any of the vulnerabilities identified or located by such software products, now known or later developed, are within the spirit of the present invention.

In addition, as used herein, a "mitigation response" is the effort undertaken to reduce unwanted consequences or to eliminate the intrusion. For example, such a response may entail sending a human computer administrator to the site of the location to update software, install anti-virus software, eliminate a virus, or perform other necessary tasks. In addition, a response may entail installing a patch to the vulnerable computer, such as across a network. One of ordinary skill in the art will recognize that the present invention does not contemplate any specific responses. Instead, any response to an intrusion requiring the organization of resources is within the scope and spirit of the present invention.

For the ease of discussion, the following discussion will focus on the systems and methods of the present invention in terms of mapping "intrusions." However, the same systems and methods may be applicable to the mapping of vulnerabilities. Reference to "threats" includes both intrusions and vulnerabilities.

FIG. 1 is a block diagram of one exemplary environment in which the systems and methods of the present invention may be implemented. As shown in FIG. 1, system 100 employs mapping computer 102. In addition, system 100 may also employ databases such as intrusion database 104, Address Routing Protocol (ARF) database 106, location database 108, and map database 110, each in electronic communication with mapping computer 102. System 100 also includes a display 114, such as a video display, for displaying the geographic information correlated and mapped by computer 102 using the methods discussed herein, and a network 112, in electronic communication with computer 102, in which the intrusions may occur.

In one embodiment, intrusion database 104 may contain information identifying an intrusion in the system, such as, for example, the intrusion type, description, and point of possible entry or exit (i.e., network point or computer). ARP database 106 may contain network location or identification information such as the IP and/or MAC address for one or more network points representing a potential point of entry or exit (i.e., network point or computer). Location database 108 may contain geographical information such as the physical address or OPS coordinates of a potential point of entry or exit. Finally, map database 110 may correlate and contain information from the intrusion, ARP, and location databases as described below to map the intrusions.

Figure 2:
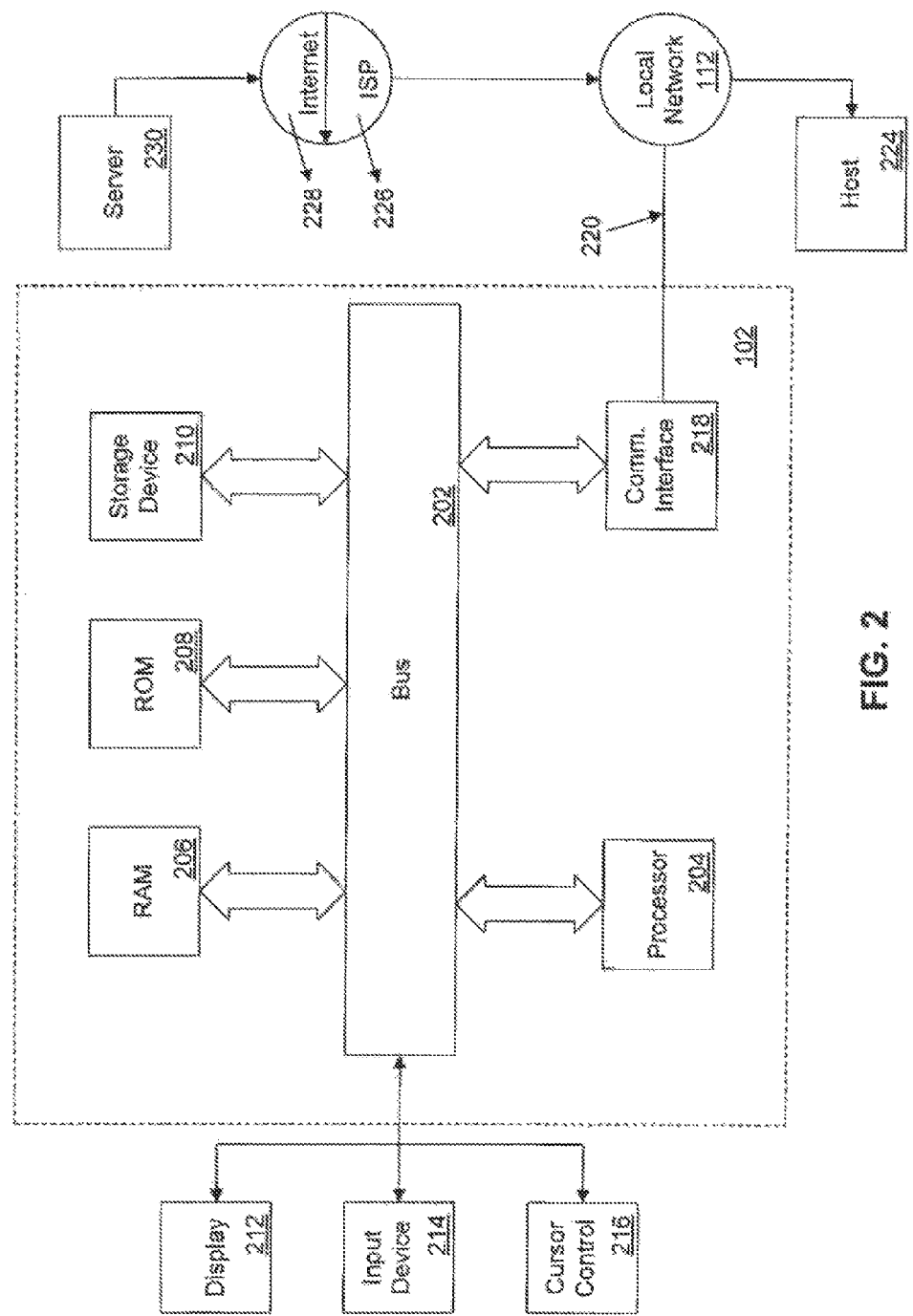
FIG. 2 is a block diagram of an exemplary embodiment of a mapping computer.

FIG. 2 is a block diagram illustrating an exemplary mapping computer 102 for use in system 100, consistent with the present invention. Computer 102 includes a bus 202 at other communication mechanism for communicating information, and a processor 204 coupled to bus 202 for processing information. Computer 102 also includes a main memory, such as a random access memory (RAM) 206, coupled to bus 202 for storing information and instructions during execution by processor 204. RAM 206 also may be used for storing temporary variables or other intermediate information during execution of instructions to be executed by processor 204. Computer system 102 further includes a read only memory (ROM) 208 or other storage device coupled to bus 202 for storing static information and instructions for processor 204. A mass storage device 210, such as a magnetic disk or optical disk, is provided and coupled to bus 202 for storing information and instructions.

Computer 102 may be coupled via bus 202 in a display 212, such as a cathode ray tube (CRT), for displaying information to a computer user. Display 212 may, in one embodiment, operate as display 114.

Computer 102 may further be coupled to an input device 214. such as a keyboard, coupled to bus 202 for communicating information and command selections to processor 204. Another type of user input device is a cursor control 216, such as a mouse, a trackball or cursor direction keys for communicating direction information and command selections to processor 204 and for controlling cursor movement on display 212. Cursor control 216 typically has two degrees of freedom in two axes, a first axis (e.g., x) and a second axis (e.g., y), which allow the device to specify positions in a two-dimensional space.

According to one embodiment, computer 102 executes instructions for geographic mapping of intrusion information. Either alone or in combination with another computer system, computer 102 thus permits the geographic mapping of intrusions in response to processor 204 executing one or more sequences of instructions contained in RAM 206. Such instructions may be read into RAM 206 from another computer-readable medium, such as storage device 210. Execution of the sequences of instructions contained in RAM 206 causes processor 204 to perform the functions of mapping computer 102, and/or the process stages described herein. In an alternative implementation, hard-wired circuitry may be used in place of, or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as RAM 206. Transmission media includes coaxial cables, copper wire and fiber optics, including the wires that comprise bus 202. Transmission media may also take the form of acoustic or light waves, such as those generated during radio-wave and infra-red data communications.

Common forms of computer-readable media include, for example, a floppy disk, flexible disk, hard disk, magnetic tape, or any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may read. For the purposes of this discussion, carrier waves are the signals which carry the data to and from computer 102.

Various forms of computer-readable media may be involved in carrying one or more sequences of one or more instructions to processor 204 for execution. For example, the instructions may initially be carried on the magnetic disk of a remote computer. The remote computer may load the instructions into a dynamic memory and send the instructions over a telephone line using a modem. A modem local to computer 102 may receive the data on the telephone line and use an infra-red transmitter to convert the data to an infra-red signal. An infra-red detector coupled to bus 202 may receive the data carried in the infra-red signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer 102 may also include a communication interface 218 coupled to bus 202. Communication interface 218 provides a two-way data communication coupling to a network link 220 that may be connected to network 132. Network 112 may be a local area network (LAN), wide area network (WAN), or any other network configuration. For example, communication interface 218 may be an integrated services digital network (ISDN) card or a modem to provide a data communication connection to a corresponding type of telephone line. Computer 102 may communicate with a host 224 via network 112. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. In this embodiment, network 112 may communicate with an Internet Service Provider (ISP) 226. For example, network link 220 may provide a connection to data equipment operated by the ISP 226. ISP 226, in turn, provides data communication services from another server 230 or host 224 to computer 102. Network 112 may use electric, electromagnetic or optical signals that carry digital data streams.

Computer 102 may send messages and receive data, including program code, through network 112, network link 220 and communication interface 218. In this embodiment, server 230 may download an application program to computer 102 via network 112 and communication interface 218. Consistent with the present invention, one such downloaded application geographically maps vulnerability or intrusion information, such as, for example, by executing methods 300 and/or 900, to be described below. The received code may be executed by processor 204 as it is received and/or stored in storage device 210, or other non-volatile storage for later execution.

Although computer system 102 is shown in FIG. 2 as connectable to server 230, those skilled in the art will recognize that computer system 102 may establish connections to multiple servers on Internet 228 and/or network 112. Such servers may include HTML-based Internet applications to provide information to computer system 102 upon request in a manner consistent with the present invention.

Returning to FIG. 1, display 114 may, in one embodiment, be implemented as display 212 (FIG. 2), directly connected to computer 102. In an alternative embodiment, display 114 may be connected to computer 102 via network 112. For example, display 114 may be a display connected to another computer on network 112, or may be a stand-alone display device such as a video projector connected to computer 102 via network 112.

In addition, databases 104, 106, 108, and 110 may each reside within computer 102 or may reside in any other location, such as on network 112, so long as they are in electronic communication with computer 102. In one embodiment, ARP database 106 may be a technical table such as the type typically resident in router points in a computer network, in which information such as the MAC address. IF address and Router (IP/MAC address) is kept.

In one embodiment, location database 108 is a dynamic or static database in which the physical location of routers or network points is located. Such location information may include router (IP/MAC) address, and router (or network point) physical address (geographic location), such as GPS coordinates. Accordingly, one of ordinary skill in the art will recognize that ARP database 106 and location database 108 may be kept in accordance with any now known or later developed methods for implementing and maintaining ARP information at router points, or physical location information, respectively.

In an alternative embodiment, databases 104, 106, 108, and 110, may be implemented as a single database, or may be implemented as any number of databases. For example, one of ordinary skill in the art will recognize that system 100 may include multiple ARP databases, such as having one for each router (not shown) in the system. Similarly, system 100 may include multiple intrusion, location, and map databases. Furthermore, in one embodiment, databases 104, 106, 108, and 110 may be implemented as a single database containing all of the described information. One of ordinary skill in the art will recognize that system 100 may include any number (one or more) of databases so long as the information discussed herein may be retrieved and correlated as discussed herein.

Finally, databases 104, 106, 108, and 110 may be implemented using any now known or later developed database schemes or database software. For example, in one embodiment, each of the databases may be implemented using a relational database scheme, and/or may be built using Microsoft Access™ or Microsoft Excel™ software. While, more likely, one or more databases will be implemented to take into account other factors outside the scope of the present invention (for example, ARP database 106 may require specific format or implementation dependent on the router within which it resides), one of ordinary skill in the art will recognize that any implementation (and location) of the present databases is contemplated within the scope and spirit of the present invention.

Figure 3:
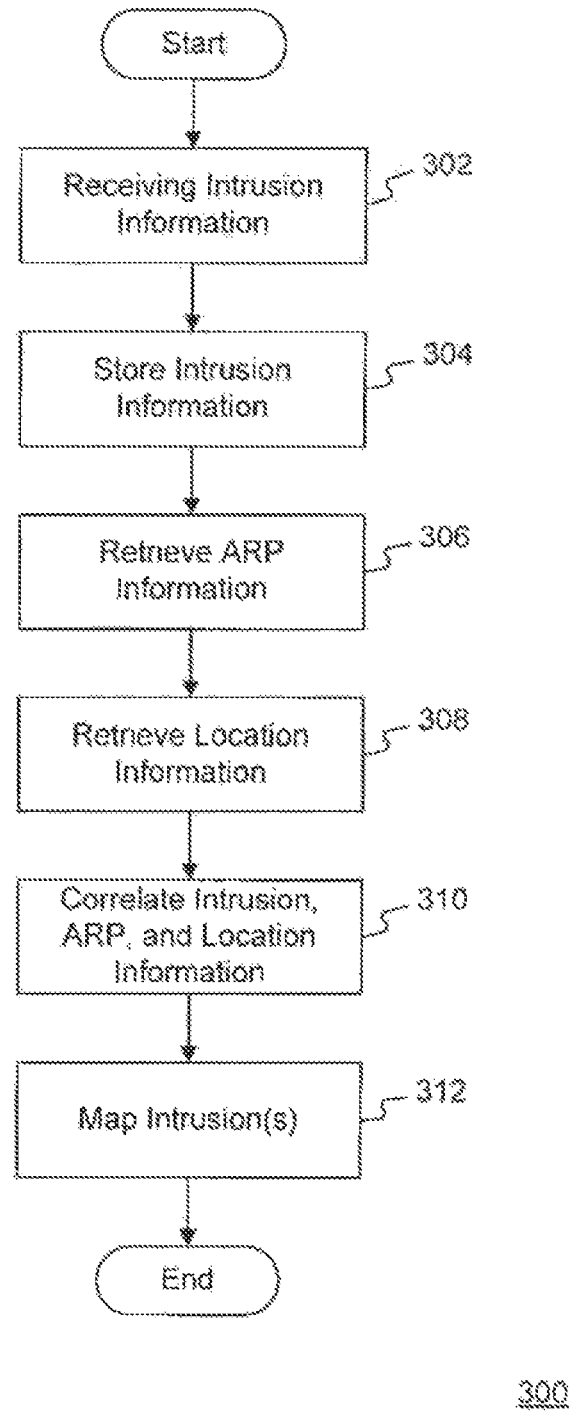
FIG. 3 is a flowchart of an exemplary method for geographically mapping response information.

FIG. 3 shows a method 300 for execution, such as by computer 102, for geographic mapping of intrusion information, consistent with the present invention. Method 300 begins by receiving intrusion information, stage 302, such as from a computer administrator, as the output of software designed to detect intrusions, from an intrusion detection system, router, network management system, security information manager, or from any other source. In one embodiment, the intrusion information may include an identification (such as the IP address) of the computer where the intrusion started or ended, the name and description of the intrusion, and possibly other data. Upon receipt of the intrusion information, it is stored in intrusion database 104 at stage 304. FIG. 4 shows one embodiment of intrusion information 400 within intrusion database 104.

Returning to FIG. 3, computer 102 then retrieves, for computers (or network points) at which an intrusion started or ended, ARP information for that computer (or network point) from ARP database 106, at stage 306. In one embodiment, the intrusion information (such as the IP address) may be used as a key to retrieve the appropriate record from ARP database 106. The ARP information may include the MAC address, and router IP/MAC address or any other network address information of the network point at which the intrusion started or ended, as necessary. FIG. 5 shows one exemplary embodiment 500 of the ARP information within ARP database 106.

In addition, computer 102 may also retrieve geographic location information for the computer at which the intrusion started or ended, from location database 108, at stage 308. In one embodiment, the intrusion data (such as IP address) and/or the ARP data (such as the router IP/MAC address) may be used as a key to identify a record corresponding to the location database record(s), corresponding to the network point. The location information retrieved may include such information as the physical location (e.g., mailing address or GPS coordinates) for the identified network point or computer or airplane. FIG. 6 shows one exemplary embodiment 600 of the location information within location database 108.

Once this information has been retrieved from databases 104, 106, and 108, it is stored in map database 110 at stage 310. Within map database 110, the retrieved information is preferably correlated such that all information for a particular intrusion is stored in a record for that intrusion. For example. FIG. 7 shows an exemplary screenshot 700 of records of map information for mapping intrusions, such as may be stored in map database 110. As shown, map database records may contain the intrusion information, the network address (such as the IP or MAC address from ARP database 106), and the physical location, such as the mailing address or OPS information (from location database 108). In addition, map database records may also include a status of the intrusion and an indication of the response person or team assigned to respond to the intrusion.

Figure 8:
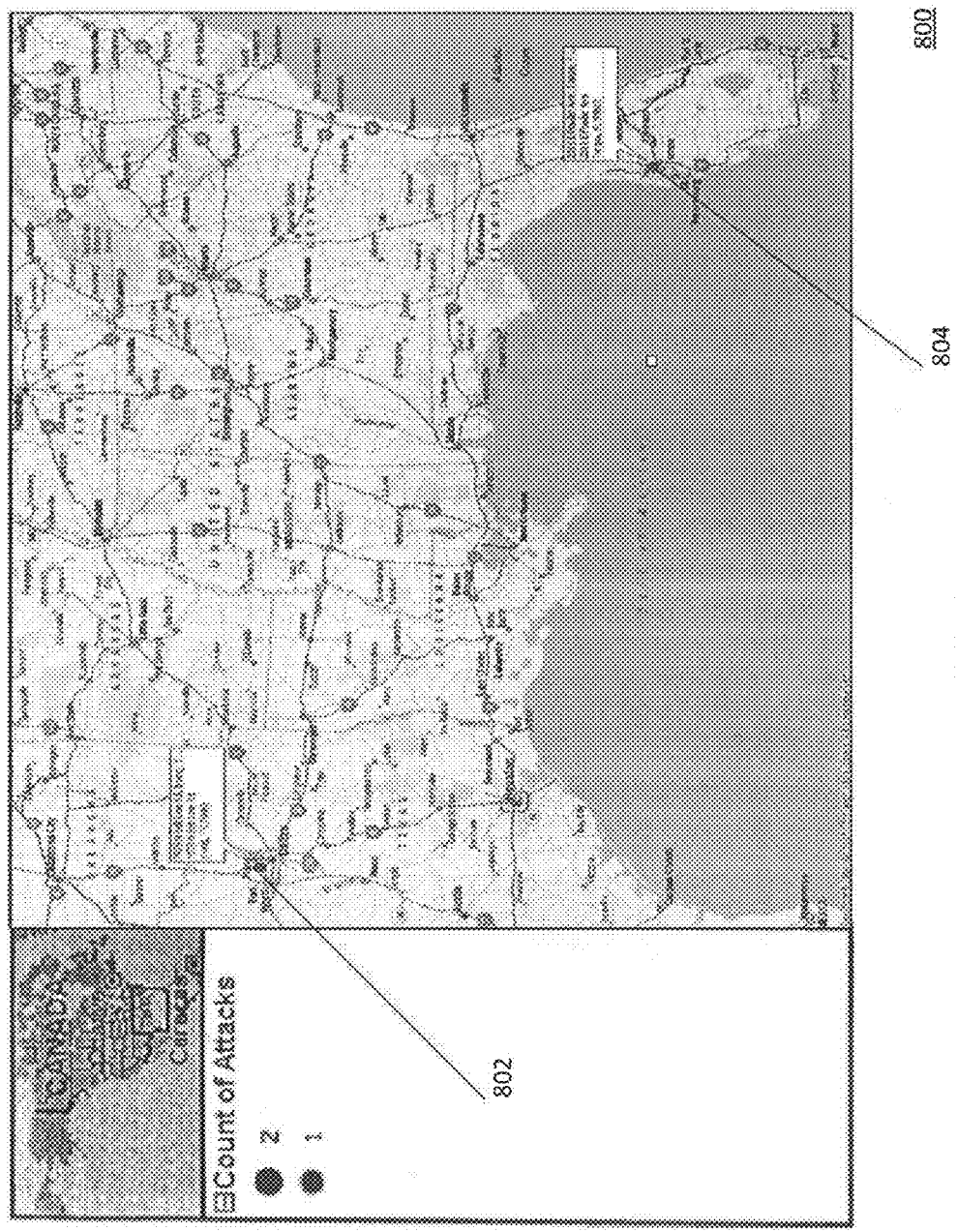
FIG. 8 is an exemplary screenshot of a map geographically mapping vulnerabilities consistent with the present invention.

Upon correlating this information within map database 110, computer 102 then maps the location of the intrusion at stage 312. In one embodiment, the location information for each record is imported into a commercially available mapping program such as MapPoint™ by Microsoft, to visually locate the intrusion points with network 112 on a map. In one embodiment, the map may represent each of the intrusions us a symbol on the map, for example, as a push pin. An exemplary map 800 using this push pin approach is shown as FIG. 8. Within map 800, each pushpin 802, 804, shows the location of a point of intrusion requiring a response.

Using map 800, response teams or system administrators will be able to better prioritize and more efficiently schedule response personnel to respond and mitigate or eliminate the intrusion, based on geographic location. In addition, by continually updating the map and matching it change over time, system operators will be able to geographically view the spread, if any, of an intrusion. Furthermore, by also tracking system updates, the administrator will be able to identify new entry points.

Figure 9:
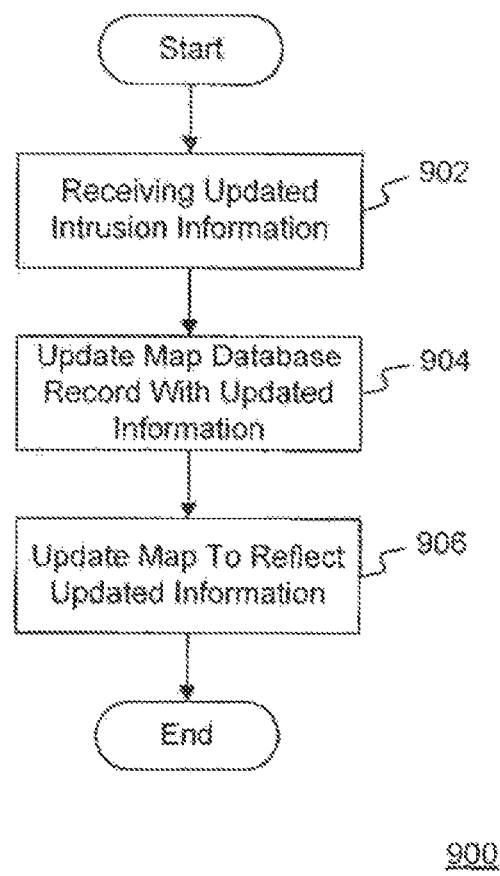
FIG. 9 is a flowchart showing an exemplary method for updating a geographic map with progress information.

FIG. 9 shows a flowchart of a method 900 for updating the geographic map with progress information. Method 900 begins with a response team or system administrator sending an update to the system to advise of a new status of a intrusion at stage 902. For example, the response team may advice the system that the intruded computer must be replaced, and be rendered inactive until it is replaced, (i.e., the intrusion is "open") or may advise the system that the intruded computer has been upgraded and is no longer compromised.

Once this information is received, the map database record for the identified intrusion is updated at stage 904. For example, each intrusion record in the database may contain a field to identify the status of the intrusion (see FIG. 7). Possible status indicators may reflect that the intrusion is "new," "open" (i.e., not yet responded to), "assigned to a response team," "closed" (i.e., responded to and fixed), or any other status that may be of use to the organization for which the system has been implemented.

Once the map database record has been updated, map computer 102 can update map 800 to reflect the updated status of the intrusion. For example, one way that map 800 can show the status information is to display color-coded push pin symbols to reflect the status. In one embodiment, a red push pin may signify an "open" or "new" intrusion, a yellow push pin may signify a intrusion that has been assigned, but not yet fixed, and a green push pin may signify a closed intrusion. By mapping this information together with the locations of the intrusions, administrators can better track the progress of their response teams, and more fluidly schedule responses to new intrusions as they arise.

One of ordinary skill in the art will recognize that, while the present invention discusses the systems and methods for mapping intrusions of a system, similar systems and methods may be utilized to map vulnerabilities to the system. For example, referring to FIG. 1, database 104 may maintain vulnerability information rather than intrusion information. Therefore, using database 104, computer 102, through the execution of methods 300 and 900, may geographically map vulnerabilities and update the status of responses to those vulnerabilities. Such methods and systems are further described in the aforementioned U.S. patent application Ser. No. 10/916,872, entitled "Geographical Vulnerability Mitigation Response Mapping System," the contents of which is incorporated by reference herein in its entirety.

One of ordinary skill in the art will recognize that any symbol pr representation may be used to identify an intrusion on the map, including, but not limited to, a push-pin symbol. These symbols and representations may be used to identify the quantity of intrusions in that area of the map, such as by varying the color of the symbol to identify such quantity. In addition, the symbol or representation may be linked to the underlying data such that a user, using an input device, may select a symbol on the map causing computer 102 to display the status, quantity, address, or other information corresponding to the selected symbol.

The preferred intrusion/vulnerability mapping systems and methods may applied in various environments using various equipment and data analogous to the described above. Described below are various specific implementations thereof in the context of certain network environments.

Figure 10:
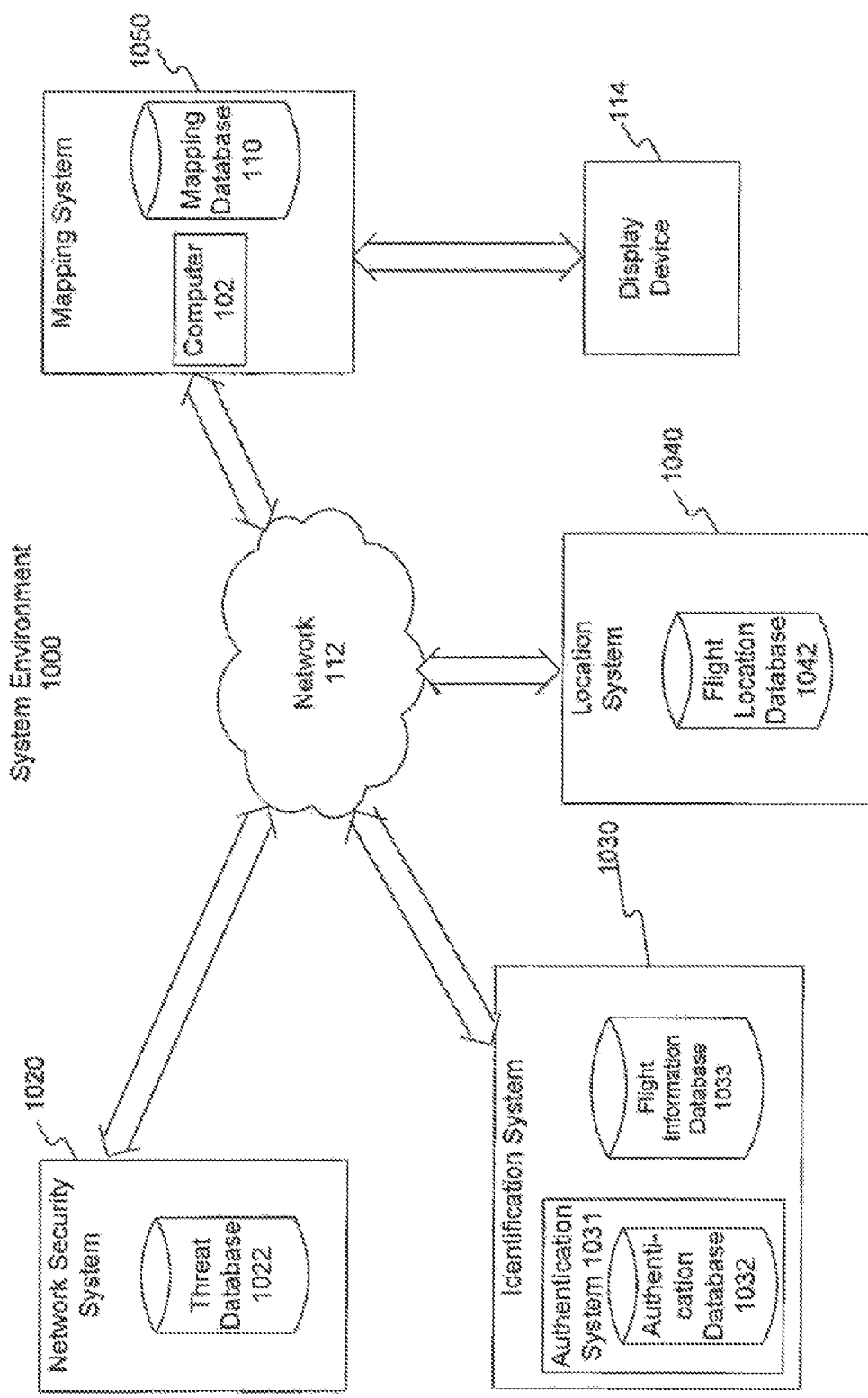
FIG. 10 is a block diagram of a second exemplary environment in which systems and methods consistent with the present invention may be implemented.

FIG. 10 is a block diagram of a second exemplary environment 1000 in which preferred systems and methods consistent with the present inversion may be implemented. The number of components in environment 1000 is not limited to what is shown and other variations in the number of arrangements of components are possible. The components of FIG. 10 may be implemented through hardware, software, and/or firmware.

As shown in FIG. 10, environment 1000 may include a network security system 1020, an identification system 1030, a location system 1040, and a mapping system 1050, each directly or indirectly in electronic communication with the other systems. Similarly to the environment 100 of FIG. 1, such communication may be conducted through a network 112 as described above. Also similarly environment 100 of FIG. 1, environment 1000 also includes a display device 114, such as a video display, for displaying the geographical intrusion information correlated and mapped by the mapping system 1050 using the methods discussed herein.

As described above, exemplary network security system 1020 includes various systems that can provide information related to network intrusions, vulnerabilities or other security threats. For example, network security system 1020 may include an Intrusion Detection System ("IDS"), firewall logs, or other systems which may be useful in identifying a threat in the environment. For example, the IDS or firewall logs may identify attacks and contain information such as the attack type, description, and impacted device information such as an IP address of the impacted device (e.g., a router, a connected computer). Network security system 1020 may also include threat database 1022, which stores threat information, such as the aforementioned attack-related information (e.g., threat type, threat description, and impacted device information such as an IP address of the impacted device). FIG. 4 illustrates one example of threat information 400 that may be stored in threat database 1022. FIG. 15 illustrates a second example of threat information 1500 that may be stored in threat database 1022. Other examples are of course possible.

Exemplary identification system 1030 may include various systems that can provide information useful for identifying network points (e.g., network equipment, connected computers, users, etc.) within environment 1000. For example, in environment 1000, identification system 1030 includes an authentication system 1031. Similarly to authentication system 1031 described above, authentication system 1031 may be implemented, for example, through the RADIUS Authentication Protocol, to verify that a user is indeed authorized to operate in environment 1000. RADIUS is used commonly with embedded network devices such as routers, modem servers, and switches. A typical RADIUS packet includes fields such as code, identifier, length, authenticator, and attributes, in one example, a RADIUS packet may contain attributes such as username and password, which may be used to identify a particular user in the network. When a RADIUS packet is sent from a network point in an aircraft, it may also contain attributes such as aircraft or flight information.

Figure 16:
FIG. 16 is an example of records in a flight information database.

A user or client may initiate an authentication process by sending a RADIUS Access-Request packet to a server in authentication system 1031. The server will then process the packet and send back a response packet to the client if the server possesses a shared secret for the client. Once the authentication is confirmed by the client, authentication system 1031 may store pertinent authentication data in authentication database 1032. Authentication data may contain, for example, an IP address, user information, aircraft or flight information and authentication identification (e.g., crypto-keys). Authentication database 1032 thus may serve as a source for identification information for network points in environment 1000 (such as aircraft). FIG. 16 illustrates one example of records storing authentication data 1600 in authentication database 1032. Other examples are of course possible.

Exemplary location system 1040 includes various systems that are useful in identifying physical (geographic) locations associated with aircraft in environment 1000. For example, location system 1040 may include a flight location database 1042, which may contain geographical information such as the geographic coordinates (e.g., latitude and longitude) for the aircrafts identified by aircraft identifications. FIG. 13 illustrates one example of records storing flight geographic information 1300 in flight location database 1042.

Exemplary mapping system 1050 may be configured to correlate data from the various databases described above, and to map threats accordingly (as further described below). Mapping system 1050 may be implemented using computer 102, map database 110 and display 114 as described above (see FIG. 1). Computer 102 may be configured to execute instructions that perform the various operations associated with the exemplary threat mapping processes described herein.

As was the case for environment 100, network security system 1020, identification system 1030, location system 1040 and mapping system 1050 of environment 1000 may be interconnected directly or indirectly, with or without network 112. Moreover, elements of each of these systems may be distributed across multiple computing platforms, or concentrated into only one or a few computing platforms. For example, network security system 1020, identification system 1030, and location system 1040 may each reside within mapping system 1050, or may reside in any other location in any combination, so long as they are in electronic communication with mapping system 1050. Likewise the various databases may be implemented as a single database, or may be implemented as any number of databases. For example, environment 1000 may include multiple authentication databases, such as having one for each geographical region served by environment 1000. Similarly, environment 1000 may include multiple threat, flight information, flight location and/or mapping databases, or a single database containing all of the described information. Any implementation (and configuration) of the system environment described herein is contemplated.

Figure 11:
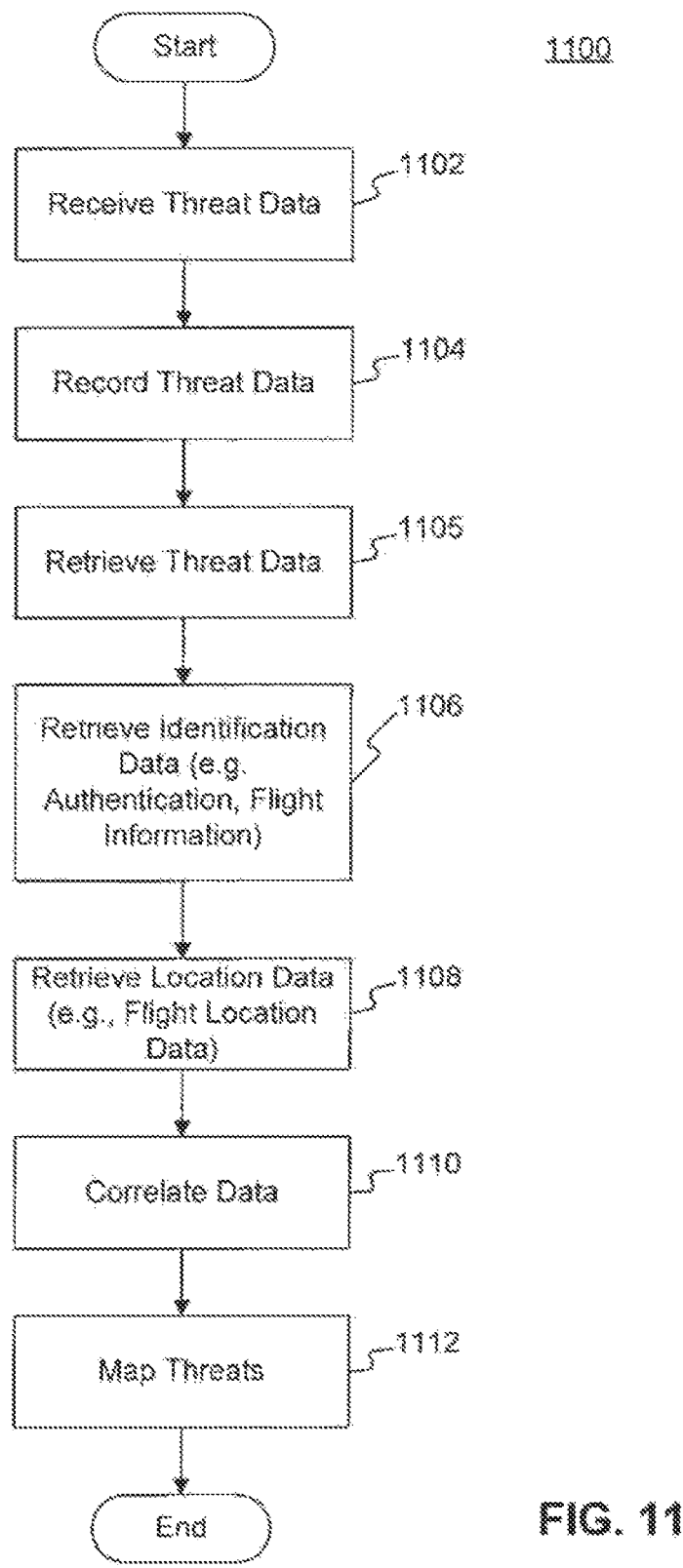
FIG. 11 is a flowchart of a second exemplary method for geographically mapping intrusion response.

FIG. 11 shows a preferred method 1100 which may be performed in conjunction with mapping system 1050 to geographically correlate and map threats in environment 1000. Method 1100 is similar in many respects to method 300 (see FIG. 3), and is presented here as specifically applicable to the exemplary environment 1000. Method 1100 begins (similarly to method 300 of FIG. 3) by receiving threat data at stage 1102 and recording the threat data in threat database 1022 in stage 1104. As noted above, threat data may be any information describing or identifying a threat. Threat data can be received from a computer administrator, from the output of software designed to detect or discover intrusions from IDS or firewall logs, from a network management system, from a security information manager, or from any other source. FIGS. 4 and 15 illustrate examples of threat data recorded in threat database 1022.

Returning to FIG. 11, in stage 1105 the mapping system receives the threat data from threat database 1022. In stage 1106, mapping system 1050 retrieves identification information, for example authentication data from authentication database 1032 and flight information from flight information database 1033, for those network points at which the threats started (or ended). In one embodiment, at least one part of the threat data (such as the IP address) may be used as a key to retrieve the associated record(s) in authentication database 1032. As shown by me example in FIG. 16, the retrieved identification data can include authentication identification, IP address, aircraft/flight information, and/or any other network address information of the network point at which the threat started or ended, as necessary.

At stage 1108, mapping system 1050 retrieves flight location data containing location data for the aircraft at which the threat(s) started or ended, from location system 1040 (e.g., from flight location database 1042). In one embodiment, at least one part of the identification data (such as authentication identification or aircraft/flight information) may be used as a key to identify and retrieve the associated record(s) in the flight location database 1042. The location data retrieved may include such information as the physical location (e.g., geographic coordinates) for the identified attacked or attacking aircraft. FIG. 13 shows an example of such location data.

At stage 1110, the retrieved data are preferably correlated such that all information for a particular threat is stored in a record or records for that intrusion. In one embodiment, the correlated data are stored as map data in mapping database 110. FIG. 7 shows an example of records in mapping database 110. As shown, mapping database records may contain the threat information, the network address (such as the IP address), and the physical location such as the coordinate information. In addition, mapping database records may also include a status of the threat and an indication of the response person or team assigned to respond to the threat.

Figure 12:
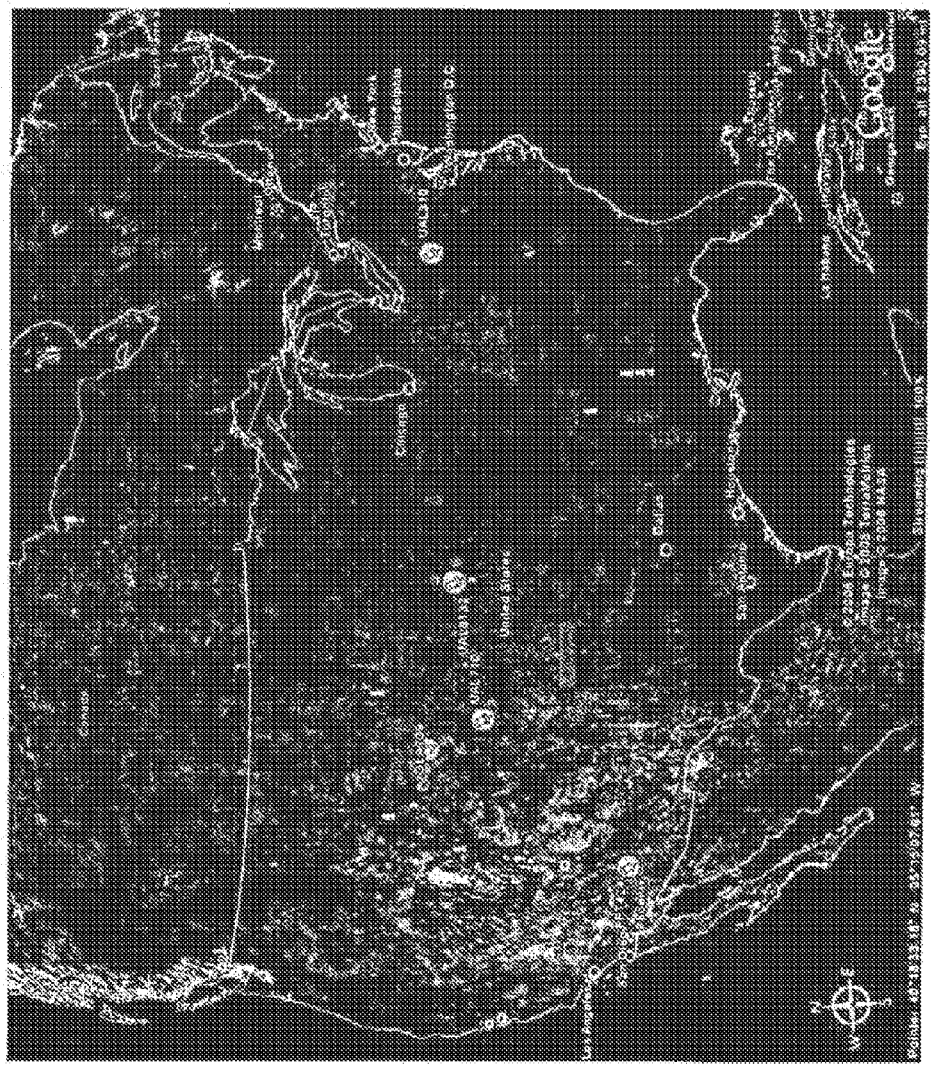
FIG. 12 is a screenshot of a second exemplary map geographically mapping vulnerability information.

Returning to FIG. 11, at stage 1112, mapping system 1050 maps the location of the threat. In one embodiment, the map data for each threat are imported into a commercially available mapping program such as Microsoft MapPoint™ to visually locate the threat points on a map presented on display 114. In one embodiment, the map may represent each of the threats as a symbol on the map, for example, as a "pushpin." For example, a map such the one depicted in FIG. 8 may be used (with flight information and geographic coordinates). Within map 800, each pushpin symbol 802, 804, shows the location of a point of threat requiring a response. The color of the pushpin symbol or representation on the map may be used to identify the quantity of threats in an area on the map, allowing the administrators to easily identify problem areas. In addition, the symbol (i.e., pushpin or other symbol) may be linked to the underlying data. FIG. 12 illustrates another map 1200 which illustrates pushpins including flight information. In some embodiments, a system user may, using an input device, select a symbol on the map to initiate a display of data such as the intrusion type, IP address, status of the response, aircraft/flight information or other information.

Figure 14A:
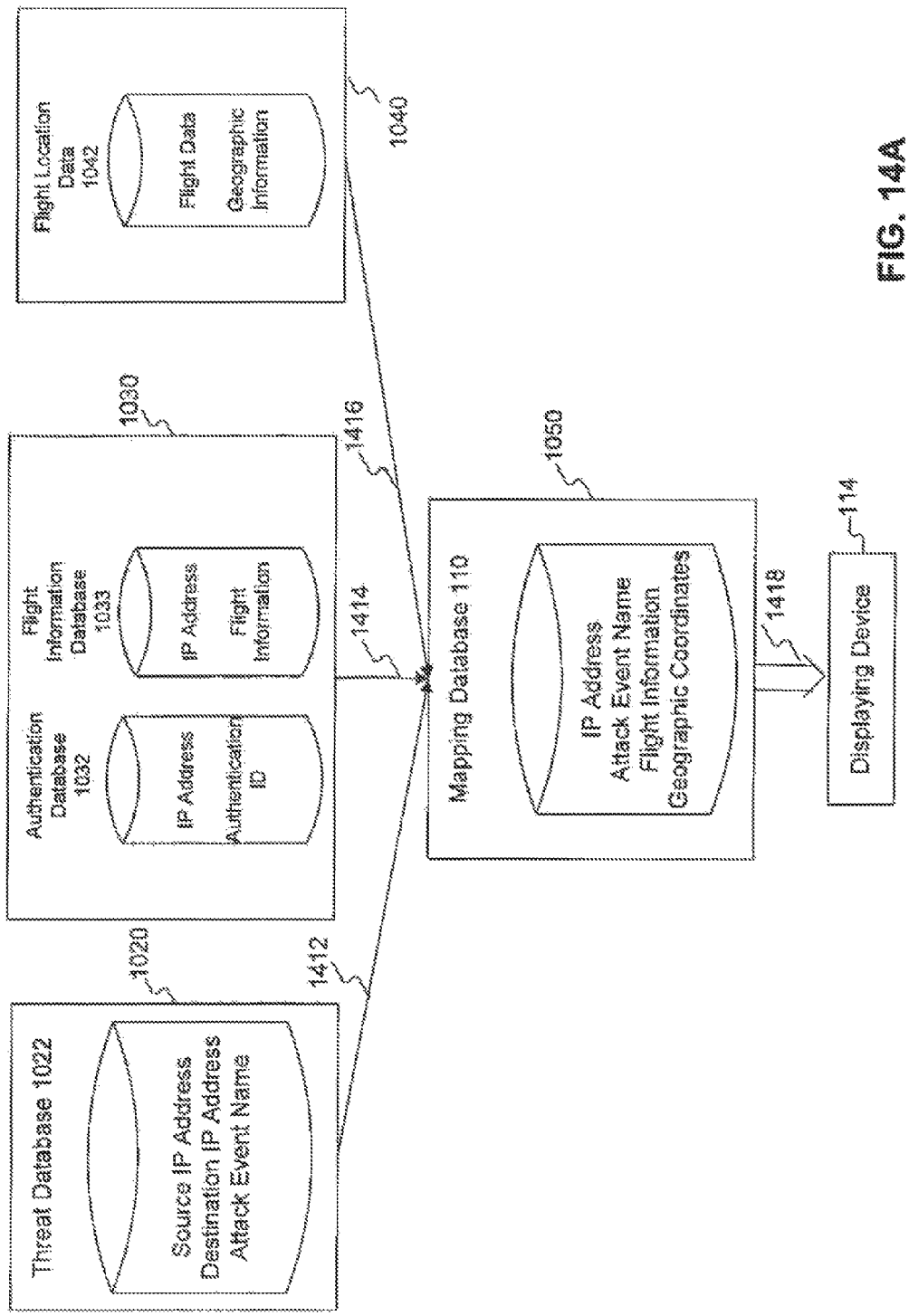
FIG. 14A is a block diagram of an exemplary method for geographically correlating and mapping threats wherein the mapping system communicates directly with the identification system.
Figure 14B:
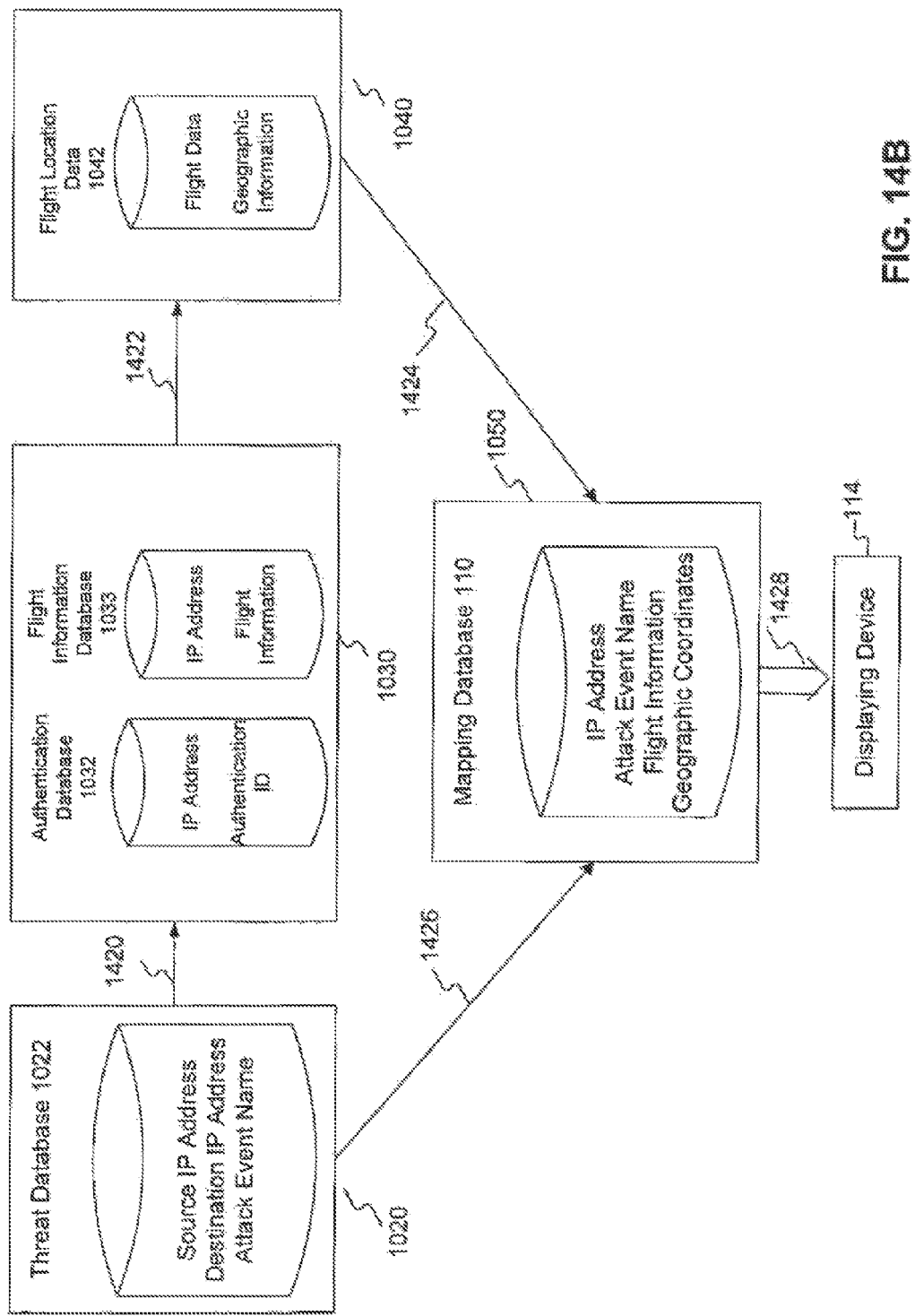
FIG. 14B is a block diagram of an exemplary method for geographically correlating and mapping threats wherein the mapping system does not communicate directly with the identification system.

FIGS. 14A and 14B are block diagrams showing two exemplary methods for geographically mapping threats through correlation. In FIG. 14A, mapping system 1050 receives, from threat database 1022 in network security system 1020, threat data containing, for example, one or more of a source IP address, destination IP address, and attack event name, at stage 1412. In addition, at stage 1414, mapping system 1050 receives identification data from the identification system 1030. The identification data may contains, for example, one or more of an IP address, authentication identification, and aircraft information. At stage 1416, mapping system 150 receives flight location data from flight location database 1042. Flight location data may contain, for example, aircraft information and geographic information such as coordinates. These stages 1412, 1414 and 1416, may take place in other sequences than described here.

After receiving threat, identification, and flight location data, mapping system 1050 correlates threat data and identification data with flight location data to generate map data. In one embodiment, mapping system 1050 joins tables from the aforementioned databases, utilizes IP address as a key to identify the record(s) indicating the source or destination of the threat and the identity of the aircraft experiencing the threat, uses the identification data to locate associated geographic coordinates, and generates map data containing IP address, attack event name, and geographic coordinates for storage in mapping database 110. This correlation may be implemented in many other ways, as is well known. At stage 1418, mapping system 1050 generates a map displaying a geographical location of the threat(s) based on the map data from mapping database 110.

In another embodiment, FIG. 14B shows an exemplary method where the mapping system does not communicate directly with the identification system. In FIG. 14B, identification system 1030 receives, from network security system 1020, threat data describing or identifying the threat(s), at stage 1420. Also at stage 1420, identification system 1030 queries the table(s) in authentication database 1032 utilizing either source IP address or destination IP address of the threat(s) in threat database 1022 as a key to identify the record(s) containing identification information associated with the IP address and queries the flight information database 1033 for information associated with an aircraft. At stage 1422, location system 1040 receives identification data from identification system 1030, and uses this data to identify the record(s) containing location data associated with the identification data from, for example, flight location database 1042.

Mapping system 1050 receives location data from location system 1040 at stage 1424 and threat data identifying the source or destination of the threat(s) from threat database 1022 at stage 1426. Mapping system 1050 correlates the threat data with location data and generates map data containing IP address, attack event name, flight information and geographic coordinates for storage in mapping database 110. In one embodiment, after stage 1422, location data contain an identifier such as an IP address or flight information and the correlation is implemented by matching the identifiers between location data and threat data. However, one of ordinary skill in the art will recognize that this correlation may be implemented in many ways. At stage 1428, mapping system 1050 generates a map displaying a geographical location of the threat(s) based on the map data from mapping database 110.

The map data in mapping database 110 may be periodically updated, as described above with respect to FIG. 9.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for displaying data associated with a cyber-attack threat against an airline, comprising:
    receiving threat data associated with a network point of an airline, wherein the threat data relates to at least one of a vulnerability or an intrusion;
    retrieving flight identification data from a flight information database in response to receiving the threat data, wherein the flight identification data comprises an Internet Protocol (IP) address of the network point;
    retrieving flight location data from a flight location database using the flight identification data;
    correlating the threat data, the flight identification data, and the flight location data to generate a record using a processor, wherein the threat data comprises a source IP address and a destination IP address, and wherein correlating comprises associating the IP address of the flight identification data with at least one of the source IP address of the threat data and the destination IP address of the threat data; and
    outputting a graphical representation reflecting the record.

2. The method of claim 1, wherein outputting the graphical representation comprises graphically distinguishing the record based on a current status of a mitigation response to the threat.

3. The method of claim 1, wherein the threat data further comprises an attack event name.

4. The method of claim 3, wherein the record comprises the attack event name, the destination IP address, and the flight location data.

5. The method of claim 1, wherein the flight identification data further comprises at least one of authentication information of a user and aircraft information.

6. The method of claim 1, wherein the flight location data comprises aircraft information and a current aircraft location.

7. A method for displaying data associated with a cyber-attack threat against an airline, comprising:
receiving threat data associated with a network point of an airline network, wherein the threat data relates to at least one of a vulnerability or an intrusion;
identifying an Internet Protocol (IP) address associated with the network point;
retrieving a router address corresponding to the network point from an Address Routing Protocol KARP) database using the IP address associated with the network point;
retrieving a geographical location for the network point from a network location database using the router address;
correlating the threat data and the geographical location to generate a map database record using a processor, wherein the threat data comprises a source IP address and a destination IP address, and wherein correlating comprises associating the geographical location with at least one of the source IP address of the threat data and the destination IP address of the threat data; and
outputting the map database record.

8. The method of claim 7, further comprising indicating in the map database record when the at least one of a vulnerability or an intrusion is new.

9. The method of claim 7, wherein outputting the map database record comprises graphically distinguishing the map database record based on a current status of a mitigation response to the threat.

10. The method of claim 9, further comprising updating the map database record based on a change in the current status of the mitigation response to the threat.

11. The method of claim 7, wherein the threat data further comprises an attack event name.

12. The method of claim 7, wherein the network location database resides in a router on the airline network.

13. A method for displaying data associated with a cyber-attack threat against an airline network, comprising:
receiving vulnerability information identifying a network vulnerability at a network vulnerability point;
identifying, based on the vulnerability information, an Internet Protocol (IP) address associated with the network vulnerability point;
retrieving, from an Address Routing Protocol (ARP) database using the IP address associated with the network vulnerability point, an address corresponding to the network vulnerability point using a processor, wherein the ARP database resides in a router on the network;
retrieving, from a network location database using the address corresponding to the network vulnerability point, geographical location information associated with the network vulnerability point;
storing a vulnerability record for the network vulnerability point reflecting a current status of a mitigation response to the network vulnerability; and
outputting a graphical representation reflecting the vulnerability record.

14. The method of claim 13, wherein the network vulnerability comprises a plurality of vulnerabilities corresponding to different computers on the airline network.

15. The method of claim 13, further comprising adjusting the graphical representation based on a quantity of identified network vulnerability points in a geographical area.

16. The method of claim 13, further comprising updating the current status of the mitigation response to the network vulnerability indicated by the vulnerability record.

17. The method of claim 16, further comprising adjusting the graphical representation to reflect a change of the current status of the mitigation response to the network vulnerability.

18. The method of claim 13, further comprising indicating in the vulnerability record when the network vulnerability is new.

* * * * *